Figure 1:
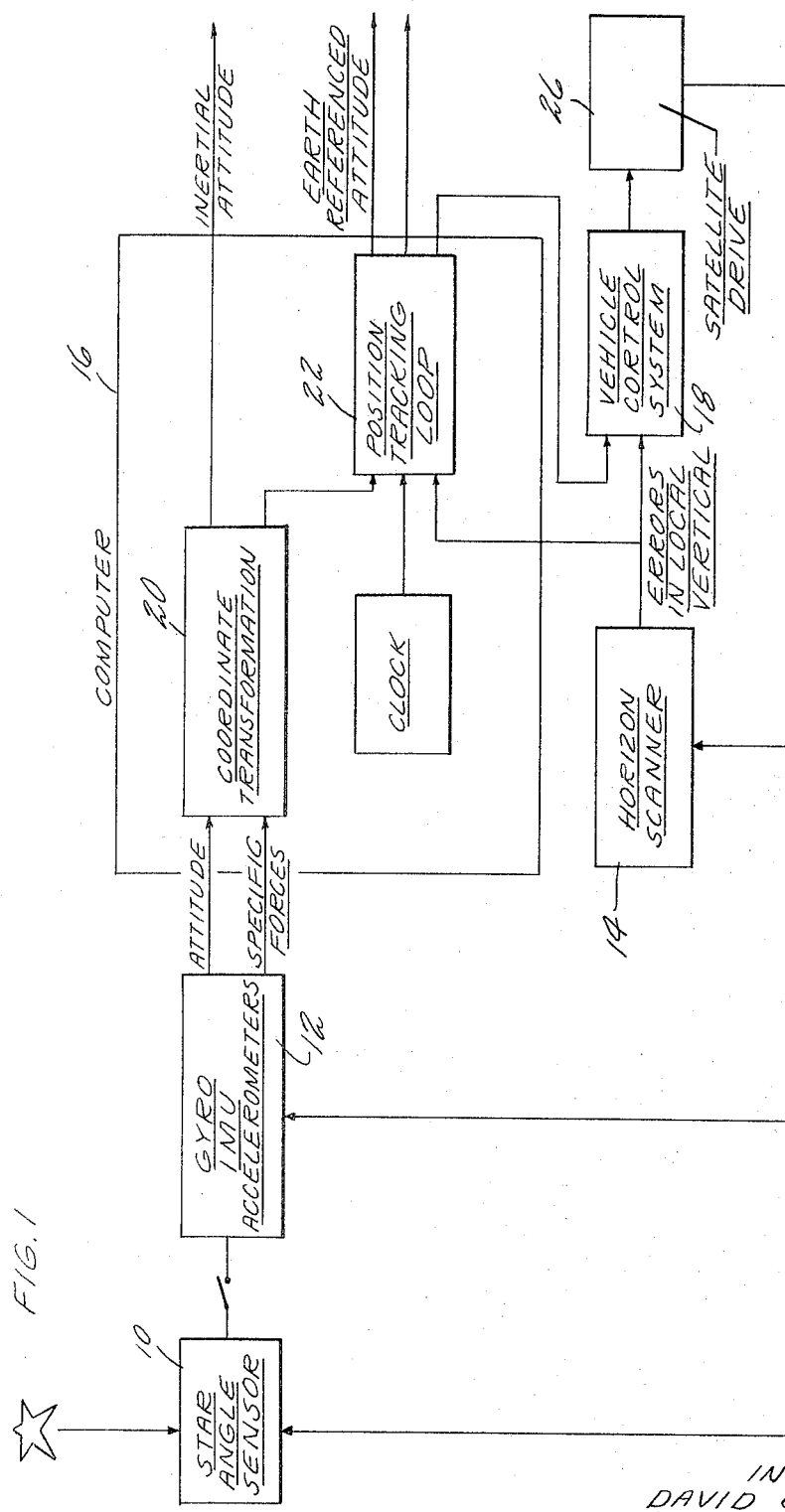

INVENTOR
DAVID C. PAULSON
BY Donald F. Bradley
AGENT

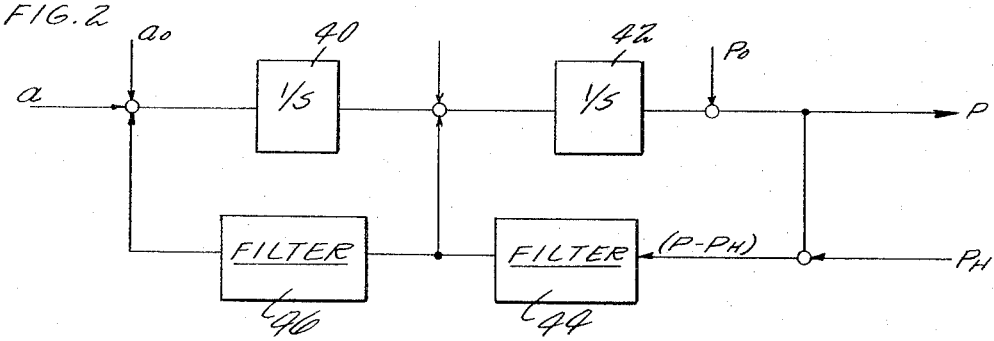
FIG. 2
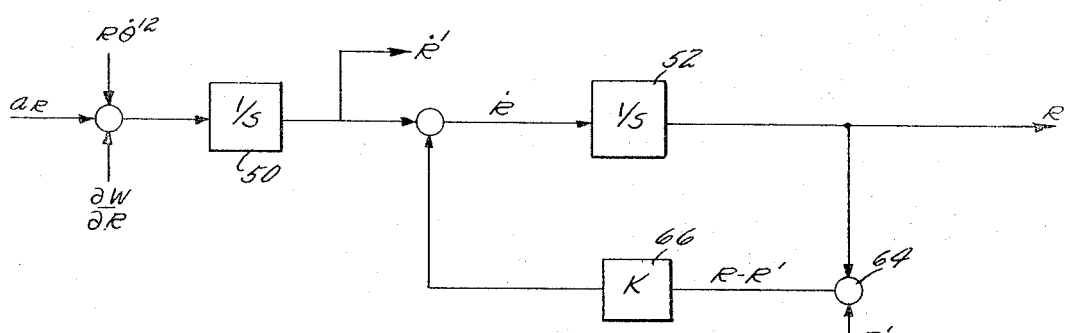
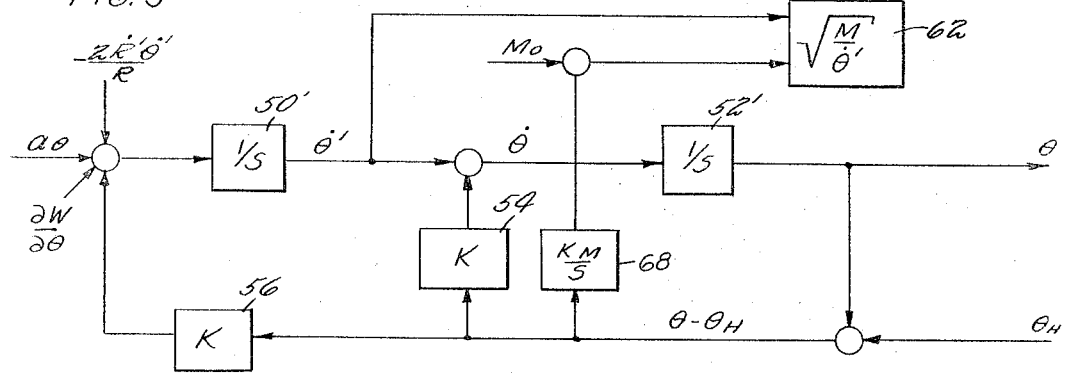
FIG. 3
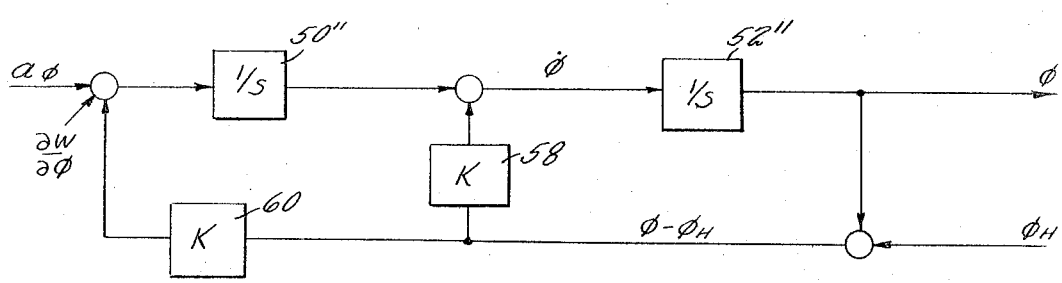
INVENTOR
DAVID C. PAULSON
BY Donald J. Bradley
AGENT

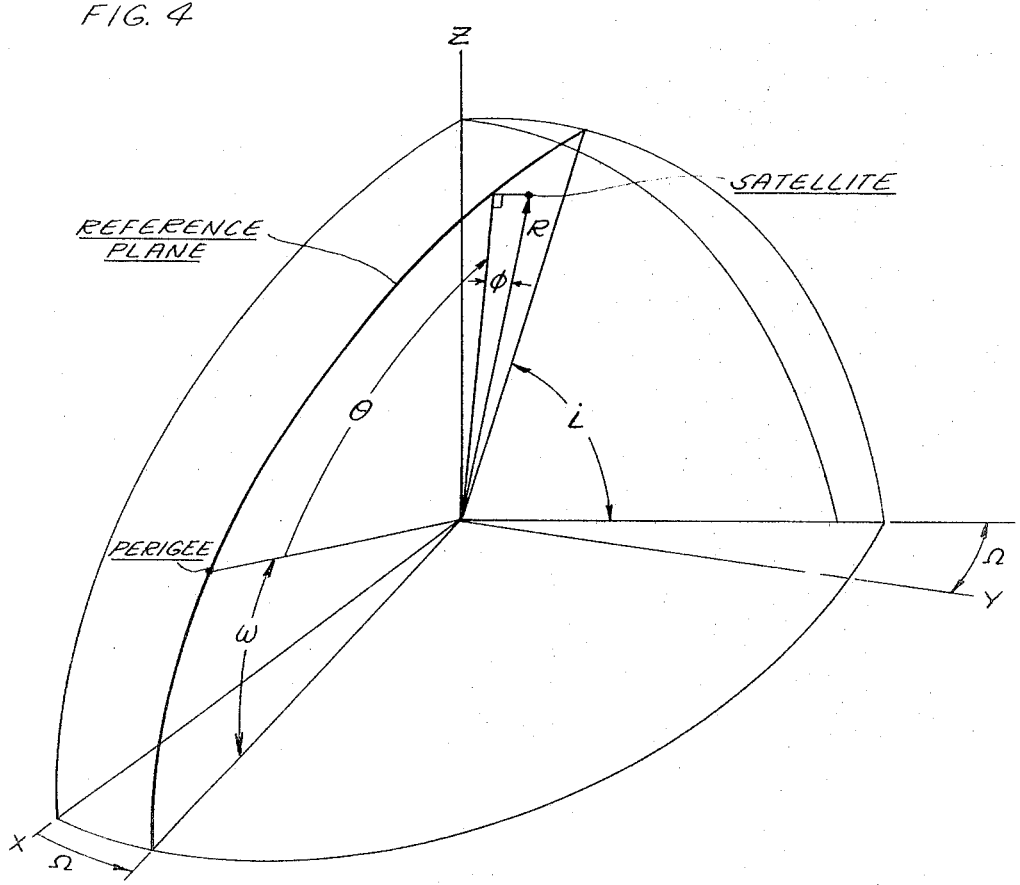

United States Patent Office 3,305,672
Patented Feb. 21, 1967

3,305,672
SYSTEM FOR BOUNDING THE RADIUS COORDINATE OF AN ORBITING VEHICLE
David C. Paulson, Thompsonville, Conn., assignor to United Aircraft Corporation, East Hartford, Conn., a corporation of Delaware
Filed Dec. 27, 1962, Ser. No. 245,937
4 Claims. (Cl. 235—150.25)

This invention relates to a space navigation system, and particularly to a stellar-inertial guidance system which will provide a continuous precise knowledge of position and attitude with respect to the earth or other body of a satellite in orbit. Specifically, this invention relates to mechanization of satellite position navigation loops utilizing spherical inertial coordinates.

Copending patent application Serial No. 115,867, entitled "Guidance System," filed June 7, 1961, by Joseph Yamron and assigned to the same assignee, discloses a stellar-inertial guidance system which provides an extremely accurate, fast response guidance and control system for use with all types of ballistic missiles. The basic concept of the copending application is that missile launch can be initiated rapidly with limited knowledge of the launch conditions. After booster separation, the vehicle performs two stellar observations in the serene environment of outer space, calculates the precise launch conditions, integrates its acceleration history to establish current position and velocity, and calculates and applies the vernier thrust required to impact on the prescribed target.

The direct application of the stellar-inertial guidance system disclosed in the copending application provides precise knowledge of position and attitude for a single orbit or possibly a two-orbit mission and permits precise recovery.

The concept of this invention adds a horizon scanner and specific tracking loop mechanization to the guidance system of the copending application and provides the navigation and guidance which will bound all guidance position errors. Thus position and attitude can be accurately maintained for longer missions lasting up to 10 days or more in a completely quiet or passive mode of operation. The maximum mission life is not limited by guidance capabilities but rather by power requirements and reliability considerations.

In order to adequately describe this invention, it is necessary to have a basic understanding of the guidance system disclosed and claimed in copending application 115,867, which is hereby incorporated as part of the present disclosure, and which should be referred to for a detailed description. For purposes of clarity, a brief summary of the essential features and components of the guidance system will now be presented.

The guidance system consists of an inertial measurement system, star angle sensor, flight computer, and a vehicle control system. A power supply system and cooling system are also provided in support of the guidance system. All of these subsystems are packaged within the reentry vehicle so that the guidance function is continuous from launch to impact.

The stellar inertial guidance system provides for a highly flexible launch posture as applied to the ballistic missile application. This flexibility makes it possible to provide a fast response, mobile, easily retargeted weapon system which may be launched in relative ignorance. It is only necessary to know one of the launch parameters precisely and the others may have uncertainties which may be compensated for following booster separation and orientation of the vehicle launch conditions on the basis of stellar observations and the recorded acceleration profiles. The degree of ignorance is only limited by the field of view of the star-angle sensor and the propulsion capabilities of the velocity control system of the vehicle.

This operational flexibility is also applicable to the space navigation system; however, the more precisely the launch conditions are known the more accurate is the injection. Injection accuracy is a prime problem for short term missions in which a horizon scanner is not used. For the space navigation system using a horizon scanner, the injection errors are rapidly attenuated and thus do not affect the precision of navigation for multiple pass missions.

In the case of well-established launch conditions, the stellar observations would permit an evaluation of certain sensor errors resulting from the boost acceleration and provide a means of compensating for these errors to obtain maximum impact accuracy or precise injection conditions as might be required for satellite applications. This capability of gyro and accelerometer compensation is described in detail and claimed in copending application Serial No. 135,358, entitled "Space Vehicle Guidance System," filed August 31, 1961, by Joseph Yamron and assigned to the same assignee, which application is hereby incorporated by reference as a portion of the disclosure of the present invention.

In the powered-flight phase, the guidance system performs the same task regardless of the mode of operation; i.e., it controls the ascent trajectory, integrating the accelerations to obtain velocity and position, and cuts off the booster power when the desired injection conditions have been attained. In the free-flight phase, the only difference in operation for different modes is that the computer program corrects different initial quantities on the basis of the stellar observations.

Another novel feature of the guidance system is that since the entire guidance package is included in the reentry vehicle, navigation during reentry is possible. The vehicle is thus capable of steering out atmospheric anomalies, aerodynamic or packaging dissymmetries, and vernier thrust cutoff errors sensed by the guidance system. A proportional type of navigation is used to generate steering commands, but it is obvious that other types may be used. These commands are executed by a vehicle control system which will trim the reentry vehicle to produce a lateral aerodynamic steering force. A reaction type of vehicle control system is preferred for ballistic missile applications, but for the satellite system it now appears that an aerodynamic or mass unbalance system will be preferable. The reentry phase of flight will be the same for all modes of system application.

The inertial measurement subsystem (IMS) provides the angular and linear sensor information to permit navigation with reference to inertial space. This unit could be of any type, i.e., stable platform or strapped-down IMS. The platform type consists of an inertial measurement unit (IMU) or stable platform, and its associated off-platform electronics.

The IMU is a four-gimbal stable platform providing three degrees of rotational freedom for a stabilized center cluster containing three gyros and three accelerometers. The fourth gimbal is necessary to avoid the possibility that a sequence of maneuvers can leave two of the three inner gimbals coplanar, thus limiting the cluster to two degrees of freedom. Under any circumstances applicable to the guidance system the fourth gimbal can be driven to a position which will maintain full rotational freedom for the cluster.

The gyros, mounted so that their sensitive axes form an orthogonal triad, serve as an inertial reference since their spin axes tend to remain fixed in inertial space. In an ideal or frictionless and zero mass gimbal system, the gyros would maintain their positions in inertial space within the limits of their own internal drift rate, which is extremely small. However, in an actual gimbal system various external disturbing torques exist and would cause errors in the spatial reference of the gyros. These errors are prevented by using each gyro as a sensing element to control a null seeking gimbal servo loop. These servos control linear D.C. motors, called torquers, mounted on each of the gimbals. When the platform is subjected to a disturbance and the gyro starts to deviate from its null position, the servo loop causes the torquers to generate torques counter to those disturbing the gimbals, thus preserving the spatial reference.

The accelerometers are mounted on the cluster so that their sensitive axes form an orthogonal triad having a known orientation with respect to the gyros. The accelerometers sense the acceleration of the vehicle. When the acceleration due to gravity is corrected for, the vehicle motions in inertial coordinates can be obtained, and the change in position and change in velocity of the vehicle calculated.

Vehicle attitude information is obtained by measuring the angle that each gimbal makes with its adjacent gimbal. To obtain these angles with the desired accuracy, an inductosyn is used. This unit is basically an air core, multispeed resolver. The inductosyn-resolver attitude information is processed in an electronic unit called the input-output unit. This unit converts the analog information from the IMU into a digital form acceptable to the digital computer, and also converts computer commands into a form acceptable by the IMU components.

The strapped-down system or the nongimballed IMU, provides a much simpler, smaller, less costly and yet functionally flexible IMU. This IMU configuration rigidly attaches all of the sensors to a ground structure whose orientation does not remain fixed in inertial space, but rather the computer keeps track of the orientation of the ground structure by means of the sensor outputs. A technique of pulse torquing is utilized to maintain knowledge of orientation rather than the normal analog-sensor signal. This technique provides the sensor outputs in a precise digital form such that adequate angular accuracy can be attained.

The strapped-down IMU is disclosed and claimed in copending patent application Serial No. 165,649, entitled "Random Orientation Inertial System," filed January 15, 1962, by Joseph Yamron and Andrew E. Scoville, and the pulse torquing system is disclosed and claimed in copending application Serial No. 138,008, entitled "Feedback Integrating System," filed September 14, 1961, now Patent No. 3,192,371, by Charles B. Brahm, both applications being assigned to the same assignee as this invention, and both copending applications are hereby incorporated by reference as part of the disclosure of this invention.

The star-angle sensor (SAS) is an integrated unit with a folded (Cassegrain) optical system to focus light energy from a selected star on a photosensitive detector. The nature of the signal is such that, through computation by the flight computer, it will provide an angular measurement of the location of the star image with respect to the optical axis. The star-angle sensor is described in detail and claimed in copending patent application Serial No. 135,339 entitled "Star Angle Sensor," filed August 31, 1961, by John Victor Hughes, now Patent No. 3,242,795, and assigned to the same assignee as this invention, and reference should be made to this application for a complete description of the star-angle sensor and its electronics.

The flight computer is the basic control and memory of the guidance system. It contains the system logic, extracts information from the sensors, performs calculations to generate navigation and guidance commands, and instructs the subsystems to execute the calculated commands. The computer controls the system for all phases of the mission from launch to impact.

The flight computer may be a general purpose, high speed, digital computer, which has high speed storage units, a data memory and a program memory. The computer is a stored program synchronous machine.

The vehicle control system is comprised of two major sybsystems—the attitude control subsystem (ACS) and the velocity control and reentry steering (VCS/RS) subsystem. The vehicle control system provides midcourse trajectory correction, reentry steering and all desired orientations and stabilizations of the reentry vehicle throughout the flight. The ACS consists of six low-thrust nozzles arranged in clusters of three each to provide orientation about three body axes whenever required.

The prior art guidance system as briefly described above can be applied directly to a satellite for a single orbit mission. However, after injection into orbit, the utility of a system dependent upon accelerometers decreases since the drag forces thereon are below the threshold values necessary to cause accelerometer displacements. Thus knowledge of posiiton degrades after one or two orbits. Further, for certain satellite missions, the guidance system must provide precise attitude and position information. While the above-described stellar-inertial guidance system provides extremely high attitude accuracy relative to inertial space for essentially indefinite time periods its position accuracy and earth referenced attitude can be considered highly accurate only for time periods equivalent to one or two orbits. The position accuracy and earth referenced attitude information degrades continuously due to the open integrations of acceleration.

The above discussed continuous degradation can be eliminated by the addition of vertical information derived from a horizon sensor. Thus, this invention relates to a stellar-inertial guidance system in which the information from a horizon sensor is used to damp the satellite inertial navigation loops. In this manner, the inertial navigator maintains its high basic accuracy and the horizon sensor eliminates the divergence of the calculated position.

Accordingly, the primary object of this invention is the provision of a guidance system which provides a continuous and precise knowledge of position and attitude with respect to earth of a satellite in orbit. As noted above, the direct application of the stellar-inertial guidance system to a single orbit or possibly two orbit mission meets this objective and permits highly accurate observations and precise recovery. However, the addition of a horizon scanner and spherical inertial coordinate mechanization of the navigation loops to the stellar-inertial guidance system provides the navigation and guidance which will bound all guidance position errors and thus permit position and attitude to be accurately maintained for multiple orbit missions. Accordingly, this invention provides a guidance system whose maximum mission life is not limited by guidance capabilities but rather by the power requirement and reliability considerations of the system.

It is therefore an object of this invention to provide a satellite or space vehicle guidance system including a stellar-inertial unit and a horizon sensor to maintain accurate position and attitude information during flight.

A further object of this invention is the use of information from a horizon sensor and a stellar-inertial guidance system in a continuous manner to provide measurement of position during flight of a space vehicle.

Another object of this invention is the use of a horizon sensor and a stellar sensor to provide signals with which to bound the normally divergent navigation computations in a space vehicle guidance system.

It is also an object of this invention to utilize angular momentum together with computed range angular velocity, the latter coming from computations of range angle which has its error bounded by information from the horizon sensor, to provide a measured radius to bound the error in computing radius thereby stabilizing the whole navigation computation.

A further object of this invention is a navigation system which provides position information with or without acceleration sensing devices, or with the accelerometer devices inactivated, or when the forces are too small to be sensed by the accelerometers.

Another object of this invention is a space navigation system in which integration of range angle error is used to correct the angular momentum for drag or other external forces applied to the vehicle during flight.

Another object of this invention is a space navigation system which permits the integration of accelerometer data to provide position information, and in which the position navigation loops are mechanized in any coordinate system.

A further object of this invention is a mechanization of satellite position navigation loops in which information from a horizon scanner provides data to damp the position loops.

These and other objects and a fuller understanding of the invention may be had by referring to the following description and claims, read in conjunction with the accompanying drawings, in which:

FIGURE 1 is a schematic block diagram of the entire satellite guidance system; and FIGURE 2 is a flow diagram of the general satellite navigation loop for computing position; and FIGURE 3 is a flow diagram of a specific satellite navigation loop for computing position; and FIGURE 4 shows the inertial coordinate reference frame and the spherical coordinate reference frame.

The addition of a horizon sensor to the stellar-inertial guidance system results in a unit, referred to as the space navigation system, which has available as basic information vehicle accelerations, referenced to inertial space, vehicle attitude referenced to inertial space, earth local vertical referenced to inertial space, and time. The subtense angle of the earth is also available, but is not required for normal operation of the space navigation system. It may, however be used for crude initial information during self-erection. This basic information, if used directly, does not provide sufficient data to accurately bound the radius coordinate. However, if these data are used in the manner set forth herein, the position and earth referenced attitude computed will be accurately bounded, and continuous precise knowledge of these quantities will be obtained.

There are many different types of horizon sensors, each of which have different characteristics. Such sensors are well known in the art, and many papers have been published describing horizon sensors, such as "Horizon Sensing for Attitude Determination," by B. K. Lunde, presented to the Goddard Memorial Symposium of the American Astronautical Society at Washington, D.C., March 16, 17, 1962.

All horizon scanners give a relatively poor signal. The choice of horizon scanners appears to be among the conical, linear and nutating types, the choice being the one which gives the best output signal. This invention is intended to filter or smooth the horizon scanner information and provide precise bounding of position, as will be described.

Satellite missions may require precise knowledge of position and attitude over relatively long periods of time. The stellar-inertial guidance system may provide adequate navigational information for short periods but the knowledge of position and attitude relative to the central body will diverge with time even with an ideal inertial reference due to uncertainties of the injection conditions and small perturbing forces. In order to prevent the errors in position and attitude from diverging without bound after injection, additional information over and above that provided by the inertial reference is required which will sense the divergence and provide corrective signals to the computer tracking loops to bound the position errors within specific limits.

The knowledge of the local vertical to the central body of the orbiting vehicle would provide a means of sensing the divergence of the tracking loop from which the corrective signal could be generated. Such knowledge of local vertical may be provided with limited accuracy from a horizon scanner. Horizon sensors of the conical, linear or nutating scan types, are suitable. All of these horizon sensors are subject to uncertainties of establishing the local vertical due to instrument errors and the physical characteristics of the horizon. Currently horizon sensors have been developed in which the instrument errors are small relative to the physical uncertainties of the input signal from the horizon. The conical scan is most subject to uncertainties since it scans the surface of the central body whereas the linear and nutating scanners only scan the region of the horizon. The nutating scanner is least subject to uncertainties since it establishes the vertical by sampling the horizon at a multitude of points whereas the linear scanner samples only three or four discrete points. Even with best possible horizon sensor performance, the instantaneous indication of the local vertical is insufficiently accurate to be utilized directly with the stellar-inertial reference to provide an indication of position. Such inputs are unable to define the magnitude of the instantaneous radius vector so that altitude is not defined. It is the purpose of this invention to describe a means of utilizing a horizon scanner in conjunction with a stellar-inertial reference unit in such a way as to bound the navigation errors and thus provide a means of precise space navigation and attitude reference. While it is to be understood that this invention is not to be limited to any specific coordinate system, the disclosed embodiment is mechanized specifically in spherical coordinates.

The space navigation concept is dependent on boost and injection of a satellite vehicle containing a stellar-inertial guidance system and a horizon scanner into orbit. The inertial guidance system may be utilized for the navigation and control of the vehicle throughout the boost phase, as described in copending application Serial No. 115,867 and 135,358. Upon injection, the star-angle sensor is used to check the alignment of the inertial reference by taking two star sights and the velocity and position of the satellite is obtained by integration of the gravity potential and inputs from the accelerometers of the IMU if the inputs are larger than the threshold of these sensors. Otherwise the accelerometers may be shut down during periods when no thrust is being applied, and these inputs assumed zero. The computer logic must compare the booster injection conditions with the desired conditions and compute and apply the velocity correction required to inject into the desired orbit with a high degree of precision. The tracking loop of the computer utilizing the inertial reference and the gravity potential thus provides an indicated position and local vertical as a function of time. The indicated local vertical is then compared with information provided by the horizon scanner, which information is transformed by inertial reference, and the difference is used as a signal which is fed back into the tracking loops through a smoothing or filter network which causes the indicated vertical of the tracking loop to approach the smoothed mean value of the horizon scanner signal. The knowledge of angular momentum is required to bound the magnitude of the radius vector or altitude. The angular momentum is used in conjunction with the indicated angular velocity of the tracking loop to generate a reference radius which is compared with the tracking loop indicated radius and the difference is fed back through a filter network to the tracking loop to bound the error in the magnitude of the position vector. The initial angular momentum of the orbiting vehicle is established by the injection conditions. However, the angular momentum will decay with time due to externally applied forces so small that they cannot be sensed by the accelerometers. The angular momentum is corrected on the basis of the smoothed horizon scanner information. This is accomplished by integrating the sensed range angle error and amplifying the integrated signal in such a manner as to correct the initial estimate of angular momentum. The feedback of the sensed vertical and radius errors, as applied to the position computer, causes the indicated position vector of the tracking loop to converge with the smoothed position vector provided by the horizon scanner information.

A simplified block diagram is shown in FIGURE 1 to illustrate one possible mechanization of the invention. FIGURE 1 shows the basic space navigation system which includes a star-angle sensor (SAS) 10, an inertial-measuring unit (IMU) 12, a horizon scanner 14, a flight computer 16, and a vehicle control system 18. The SAS 10 is trained on selected stars, and the SAS output signal is utilized to periodically update and calibrate the gyros in the IMU 12 for drift and scale factor in order that the inertial reference may be preserved. This operation is described in application Serial No. 115,867. The IMU 12 may be either a stable platform or strapped-down unit which contains a set of three gyros and three accelerometers from which changes in orientation and linear motion are sensed. The outputs of these IMU sensors are fed to computer 16 where, if necessary, a coordinate transformation takes place as shown by block 20. The transformed IMU outputs are then utilized by computer 16 to provide a direct attitude reference with respect to inertial space, and, by means of position tracking loops shown at 22, to provide a local earth referenced attitude output as well as an indication of velocity and position. This is accomplished in the computer 16 by integration of the tracking loop of the accelerations due to the gravitational fields and the applied forces. A clock 24 in the computer 16 provides a means of correlating the position information with time and with earth fixed coordinates. The tracking loop 22 is also provided with a signal from the horizon scanner 14 which is proportional to the deviation of the local vertical from the horizon scanner axes and which, when added to the attitude of the horizon scanner axis as provided by IMU 12, the orientation of the sensed local vertical relative to inertial space is obtained.

The deviation of the tracking loop indicated vertical from the horizon scanner sensed vertical is filtered or smoothed within the tracking loop 22 and fed back on the loop with appropriate gains to tune and damp the loop in such a manner as to make the indicated position of the tracking loop coincide with the smoothed information from the horizon scanner 14. On the basis of the indicated position of the tracking loop 22 and knowledge of the desired orientation, control commands will be generated for the vehicle control system 18 to drive the satellite 26 in attitude and velocity. The application of the control signals and forces to the vehicle by means of satellite drive 26 result in motions which are immediately transmitted to the various sensors as shown by the heavy lines.

The signal from horizon scanner 14 is also shown feeding into the vehicle control system 18 where it may be used as a redundant control signal in order to stabilize the vehicle with respect to the local vertical if the remainder of the navigation system was not functioning for some reason.

The general tracking loop concept is presented schematically in FIGURE 2 and represents the basic concept of mechanizing the equations of motion in conjunction with an external indication of position relative to the central body to feedback the deviation between indicated and sensed position via a filter which will smooth and meter the feedback to obtain the desired results. Basically the initial conditions $g$, the force exerted by gravity, and acceleration from potential fields and applied forces $a$ are integrated once at 40 to obtain velocity V and a second time at 42 to obtain position P. The indicated position P is then compared with the position indication $P_H$ from the external source such as the horizon scanner to generate a differential signal $(P-P_H)$ which is fed back through the filter circuit 44 with the desired gains 46 to velocity and acceleration. Since the output of the horizon scanner is an angle, the position indication $P_H$ may be first multiplied by a distance measurement obtained from the navigation loops to transform the angle into a pure distance quantity. The feedback on velocity provides damping of the network whereas the feedback on acceleration tunes the network with the external information of the horizon scanner. There are many ways of mechanizing the generalized tracking loop of FIGURE 2 representing utilization of various inertial coordinate frames and methods of utilizing the external information in conjunction with the network simulating the equations of motion. The most suitable mechanization is dependent upon the mission requirements and types of system errors associated with the particular hardware used.

The following description is of a specific mechanization of the generalized tracking loop disclosed in FIGURE 2. This specific mechanization, shown in FIGURE 3, utilizes spherical inertial coordinates as defined by the magnitude of the radius vector R and two angles, the range angle $\theta$ and the out-of-plane or cross-range angle $\phi$ of a reference orbit. This reference orbit, shown in FIGURE 4 is coincident with the satellite's orbit at some initial time such as booster burnout. At any subsequent time, $\theta$ defines the angle in the plane of the reference orbit from its perigee to the projection of the present satellite position vector on the plane, and $\phi$ defines the angle between the position vector and the plane. The accelerations $A_R$, $A_\theta$, and $A_\phi$ are the transformed accelerometer inputs which are generally zero while in orbit. However for maneuvers or low altitudes where the drag deceleration is sufficiently large to be sensed by the accelerometers, these inputs will be measurable. In addition, the inertial accelerations of the rotating coordinate system are fed into the three loops, and the gravitational accelerations $\partial W/\partial R$, $\partial W/\partial \theta$, and $\partial W/\partial \phi$ are fed into their respective loops, where the gravity model, W, may be a spherical or oblate potential. The summation of the accelerations is integrated once at 50, 50′, and 50″ to obtain the radial and two angular velocities, respectively. The second integration at 52, 52′, and 52″ yields the indicated position radius vector in magnitude and direction. Because of errors in initial conditions and problems of integration, these basic loops would diverge. To prevent divergence, measured angles from the horizon scanner, $\theta_H$ and $\phi_H$, are compared to the computed values of $\theta$ and $\phi$ and the difference is fed back through the gains 54, 56, 58, and 60 to damp and tune the loop in such a manner as to drive the error signal to zero or cause the indicated angular positions to converge with the smoothed $\theta_H$ and $\phi_H$ inputs. The quantities $\theta_H$ and $\phi_H$ are computed by resolving the horizon scanner inputs with respect to the inertial measurement unit (IMU) into components in and normal to the reference plane of FIGURE 4. To prevent divergence of the radius (R) loop, a reference radius R′ is obtained from the angular momentum (M) of the orbital vehicle using the relationship:

$$M=(R^1)^2\theta^1 \text{ or } R^1=\sqrt{M/\theta^1}$$

as shown in block 62. R′ is compared to the calculated R at junction 64. The difference is fed back on the R loop through the gain network 66.

Uncertainties in angular momentum cause steady state errors in the R and $\theta$ loops. Since the error in $\theta$ has a sign opposite that of the momentum uncertainty, it is possible to integrate this error signal at 68 and sum it with the initial angular momentum $M_o$ to provide a continuously updated value of momentum. This is used in conjunction with the indicated angular velocity for determination of the reference radius R′. The gain $K_M$ at 68 adjusts the rate of updating the angular momentum (M).

Because the orbital plane describing the actual satellite motion will precess away from the reference plane of FIGURE 4 due to oblateness of the central body, it may be necessary to define a new reference plane at given intervals to preserve the uncoupled behavior of the two angles $\theta$ and $\phi$ of the chosen coordinate system. This can be accomplished based on any set of horizon scanner measurements, and need not be exact. As should be obvious, the disclosed invention can be mechanized in other coordinates, such as Cartesian coordinates, without deviating from the spirit and scope of this invention.

Utilizing a horizon scanner in conjunction with a stellar-inertial guidance system in such a manner provides a navigation system in which the positional errors are adequately bounded to provide a precise self-contained guidance system for relatively long term orbital missions. This guidance system is also capable of sensing and following any and all maneuvers executed during the mission or may be used in conjunction with a velocity control system to follow a preplanned orbital path compensating for all anomalies of atmosphere, gravity, solar pressure, etc.

The type of guidance system described permits a large degree of flexibility of operation since it can be launched in ignorance into a preplanned orbital path and can orient itself and correct its orbital path to synchronize with the preplanned position. The degree of ignorance of launch is limited only by the propulsion capabilities of the velocity control system. The boost phase utilizes only the guidance logic of the stellar-inertial guidance systems previously described. Once in orbit, the horizon scanner is closed into the tracking loop in the manner previously described. Any bias of the horizon sensor will contribute a systematic error into the navigation system unless the sensor bias is compensated for. Thus it is necessary to minimize the effect of this bias by compensation, by calibration or by automatic mechanization. Calibration is possible by comparison of horizon scanner outputs with the instrument rotated to different orientation in inertial space or may be automatically compensated for by continuous slow rotation of the sensor such that the effect of the bias is integrated out to be zero. This latter scheme may be easily accomplished if not inherent in a nutating scanner. The scale factor of the scanner does not have to be known precisely since it is used only as a feedback signal which is driven to a null.

The accelerometers are not essential in orbit and may be shut down during orbital flight to conserve power. Small perturbing forces causing gradual changes in the flight path will be sensed by the horizon scanner and the tracking loop will follow these changes of flight. If large or sudden changes of orbital path are contemplated, the accelerometers will be reactivated to sense the accelerations caused by the applied forces, and then shut down again. The precision of the accelerometers is not critical since they are only operating for short periods of time and any error in measurement of the delta velocity will be damped out and eliminated by the tracking loop. For a small correction of $\Delta V$, the navigation system could function without the accelerometers at the expense of some temporary reduction of the precision of navigation whereas on a long term basis the precision would be unaffected.

The gyros which maintain the inertial reference must be trimmed periodically to compensate for their drift. This may be accomplished by either trimming the gyros themselves or affecting a coordinate transformation in the computer. By successive periodic stellar observation and adequate logic the gyros may be trimmed in space to eliminate all but the random drift. The gyro scale factor must also be determined in the case of a strapped-down inertial measuring unit in lieu of the gimbal angle measurement of the stable platform. In order to calibrate the scale factor in space it is necessary to measure the difference between position vectors of two known stars about the input axis of each of the gyros. The above-mentioned calibrations of the sensors is sufficient to erect the system in space and is dependent only upon never permitting the inertial reference to degrade beyond the field of view of the SAS.

The navigation system will function with bounded tracking errors when the vehicle accelerations are too small to be measured, when accelerometer measurements are not precise, and even when appreciable accelerations are present but not measured. This is because the external information is used to bound the range angle and cross range angle loops directly, and is also used to correct the angular momentum which in turn is used to bound the radius loop.

This invention discloses material similar to that disclosed but not claimed in copending application Serial No. 226,200, entitled Satellite Guidance System, filed September 28, 1962, by Lawrence R. Manoni, Jr., and assigned to the same assignee.

It is obvious that the present disclosure is by way of example and that many changes may be made in the structure of the invention without departing from the scope of the invention as hereinafter claimed.

I claim:

1. In a space navigation system for an orbiting vehicle, said navigation system defining the orbit of said vehicle with respect to a reference body in a coordinate system in which said coordinates are range angle, cross range angle and the radius measured along a line connecting said vehicle with the center of said reference body, comprising means for producing a vehicle acceleration signal for each of said coordinates, first integrating means for integrating each said vehicle acceleration signal into a vehicle velocity signal for each said coordinate, second integrating means for integrating each said vehicle velocity signal into a vehicle indicated position signal for each said coordinate, means for producing a vertical signal indicative of the local vertical of said vehicle with respect to said reference body, means responsive to said vertical signal for producing signals indicative of the measured position of said vehicle relative to said range angle and cross range angle coordinates, means for comparing said measured vehicle position relative to said range angle and cross range angle coordinates with said indicated vehicle position signals relative to said range angle and cross angle coordinates and producing therefrom an error signal for each of said range angle and cross range angle coordinates, means for feeding back said range angle error signal to the input of each of said first and second range angle integrating means, and for feeding back said cross range angle error signal to the input of each of said first and second cross range angle integrating means whereby said range angle and said cross range angle coordinates are bounded, means for producing a signal indicative of initial vehicle angular momentum, means for combining said range angle error signal with said initial vehicle angular momentum signal for producing an updated momentum signal, and means for producing from said updated momentum signal a radius coordinate error signal and for feeding said radius coordinate error signal to the input of said radius coordinate second integrating means whereby said radius coordinate is bounded.

2. In a space navigation system for an orbiting vehicle, said navigation system defining the orbit of said vehicle with respect to a reference body in a coordinate system in which said coordinates are range angle, cross range angle and the radius measured along a line connecting said vehicle with the center of said reference body, comprising
- means for producing a vehicle acceleration signal for each of said coordinates,
- first integrating means for integrating each said vehicle acceleration signal into a vehicle velocity signal for each said coordinate,
- second integrating means for integrating each said vehicle velocity signal into a vehicle indicated position signal for each said coordinate,
- means for producing a vertical signal indicative of the local vertical of said vehicle with respect to said reference body,
- means responsive to said vertical signal for producing signals indicative of the measured position of said vehicle relative to said range angle and cross range angle coordinates,
- means for comparing said measured vehicle position relative to said range angle and cross range angle coordinates with said indicated vehicle position signals relative to said range angle and cross angle coordinates and producing therefrom an error signal for each of said range angle and cross range angle coordinates,
- means for feeding back said range angle error signal to the input of each of said first and second range angle integrating means, and for feeding back said cross range angle error signal to the input of each of said first and second cross range angle integrating means whereby said range angle and said cross range angle coordinates are bounded,
- means for producing a signal indicative of initial vehicle angular momentum,
- means for integrating said range angle error signal and combining said integrating range angle error signal with said initial vehicle angular momentum signal to produce an updated momentum signal,
- means for combining said updated momentum signal with said vehicle range angle velocity signal to produce a reference radius signal,
- means for comparing said reference radius signal with said radius position signal to produce a radius error signal,
- and means for feeding said radius error signal to the input of said radius coordinate second integrating means whereby said radius coordinate is bounded.

3. A space navigation system as in claim 2 and including means for multiplying said integrated range angle error signal by an adjustable gain to thereby adjust the rate of updating said initial angular momentum signal.

4. A space navigation system as in claim 3 in which said vertical signal producing means is a horizon sensor.

References Cited by the Examiner

UNITED STATES PATENTS

| | | | |
|---|---|---|---|
| 2,914,763 | 11/1959 | Greenwood et al. | 235—187 |
| 2,930,545 | 3/1960 | Houle et al. | 244—14 |
| 2,963,243 | 12/1960 | Rothe | 244—1 |
| 3,028,592 | 4/1962 | Parr et al. | |
| 3,048,352 | 8/1962 | Hansen | 244—3.18 |
| 3,103,579 | 9/1963 | Green | 235—187 |

OTHER REFERENCES

"An Automatic Astro Compass," Nichinson, Navigation, Autumn 1958, pages 182–189, vol. 6, No. 3.

"Interplanetary Navigation by Optical Resection and Inertial Systems," Carroll, Aero/Space Eng., vol. 18, No. 3, pages 53–55, 75, March 1959.

SAMUEL FEINBERG, *Primary Examiner.*

BENJAMIN A. BORCHELT, *Examiner.*

T. A. ROBINSON, M. F. HUBLER, *Assistant Examiners.*